Dec. 24, 1963     C. K. BROWN     3,114,962
SEPARABLE FASTENER AND PARTS CATCHER THEREFOR
Filed Dec. 21, 1961
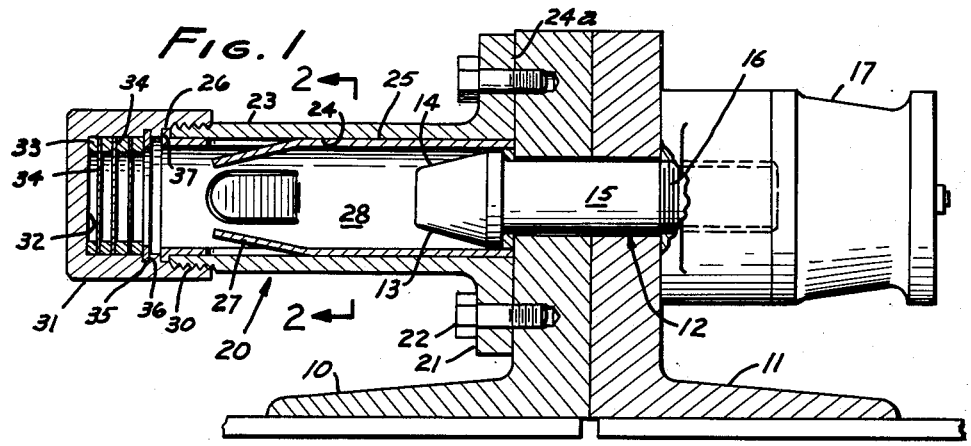
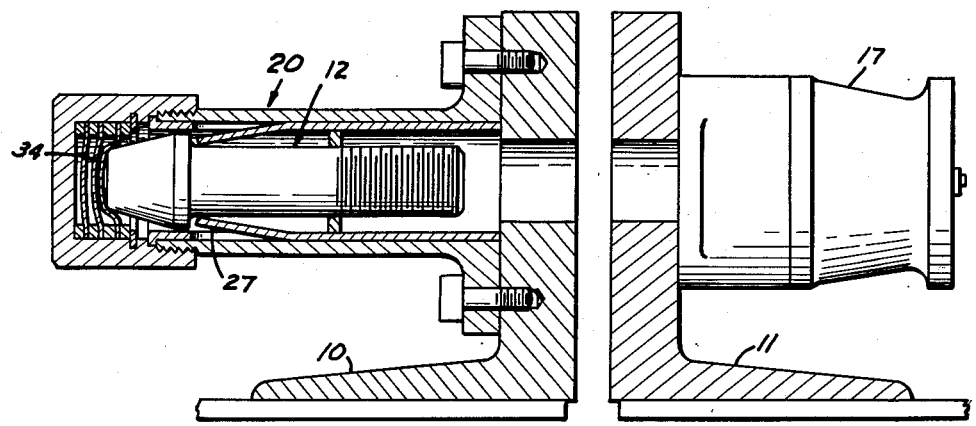
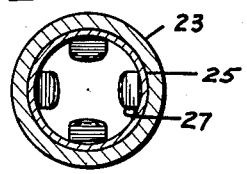
INVENTOR.
CLARENCE K. BROWN
BY
*Angus & Mon*
ATTORNEYS.

3,114,962
SEPARABLE FASTENER AND PARTS
CATCHER THEREFOR
Clarence K. Brown, Long Beach, Calif., assignor to Hi-Shear Corporation, Torrance, Calif., a corporation of California
Filed Dec. 21, 1961, Ser. No. 161,013
6 Claims. (Cl. 29—200)

This invention relates to a bolt catcher for use in fastener separation systems wherein the separated parts of the fasteners must be held captive.

The explosive separation of fasteners is finding increasing utility, particularly where various assemblies must quickly be separated on a signal. One known technique of accomplishing this separation is by the use of a bolt and a separable nut. The separable nut is usually explosively actuated. Upon its actuation, it releases the threads of the bolt and shoots the bolt away from it. Normally, the nut itself is held captive to one of the objects which was joined, and the problem remains to capture the bolt, while still being certain that the assemblies are freed from each other.

While there are many installations in which it is permissible to shoot away the bolt, because there is no risk to personnel or structure, still in many others there is such risk, and the bolt must be held captive.

Attempts have been made to provide means for catching bolts and the like, but in solving the problem of catching the bolt, they have introduced another, namely damage by mechanical shock to other structure and devices to which they are physically connected. This latter problem arises from the fact that, in stopping the bolt, they have done so in such a manner that the kinetic energy of the bolt is directly transmitted to surrounding structure.

It is an object of this invention to provide means for catching a bolt, which do so in such a manner that part of the kinetic energy of the bolt is absorbed by the catcher. In this manner, much less shock is transmitted to the structure than by conventional catchers.

A bolt catcher according to this invention includes a body adapted to be mounted to one portion of structure being joined by a fastener system. A typical system would include a separable nut, and a bolt which is to be caught. Retainer fingers which extend at an angle into the catcher's sleeve in the direction of bolt movement are placed inside the body, and permit the head of the bolt to move past them, and thereupon snap over the back side of the bolt head to prevent the bolt's rebounding.

According to a preferred but optional feature of the invention, a plurality of spaced-apart discs is provided in the cavity where they are struck by the flying bolt, and are deformed by it, kinetic energy of the bolt being absorbed by deformation of the discs. The energy which is dissipated in the deformation is not transmitted to the body and surrounding structure, and the mechanical shock to the body and surrounding structure is thereby lessened.

The above and other features of this invention will be fully understood from the following detailed description and the accompanying drawings in which:

FIG. 1 is a side elevation partly in cutaway cross-section showing a fastener system and a bolt catcher according to the invention;

FIG. 2 is a cross-section taken at line 2—2 of FIG. 1; and

FIG. 3 is a side elevation partly in cutaway cross-section showing the operation of the bolt catcher of FIG. 1.

In FIG. 1, there is shown a pair of flanges 10, 11, which are parts of structure to be joined by a fastener system. The fastener system includes a bolt 12, having a head 13, preferably with a tapered periphery 14, a shank 15 for passing through aligned holes in the flanges, and threads 16 on the end away from the head.

A separable nut 17 of the type shown in the presently pending patent application of William R. Dickie, filed July 29, 1959, Serial No. 829,674, entitled "Separable Nut," assigned to the same assignee as the instant application, may readily be threaded on to threads 16. Such a nut includes internal threads for the purpose, together with a squib for removing the nut's threads from the threads of the bolt and also exerting a fluid pressure on the end of the bolt for expelling the bolt from the separable nut.

A bolt catcher 20 according to the invention is shown attached by ears 21 and bolts 22 to flange 10. It includes a body 23, having a cylindrical passage 24 opening at its base end 24a. A catcher sleeve 25 fits into the passage, and has a shoulder 26 which hooks over the end of the body. The sleeve includes a plurality of retainer fingers 27 which are punched out of the wall material of the sleeve, and which extend into the cylindrical opening 28 in the sleeve as they extend axially away from the base end of the body.

External threads 30 are provided on the outside of the body to receive an internally threaded cap 31. The cap has a sink 32 which holds a stack of four ring-shaped washers 33 interspaced by three circular discs 34 to form a barrier. These discs are made of deformable metal such as soft aluminum (2SO) or, for higher velocities, a fully annealed stainless steel, and have as their object to be deformed by the bolt after separation. More or fewer discs can be added depending on the expected kinetic energy of the bolt to be caught, the greater the kinetic energy, the more discs should be provided.

A spiral lock ring 35 is seated in a ring groove 36 inside the cap to retain the stack of washers and discs so that the cap and its contents can be handled as a single piece. The cap can readily be threaded onto the threads 30 of the body. The cap also includes a shoulder 37 which bears against shoulder 26 of the sleeve, thereby holding the sleeve firmly in position, and restraining it from axial movement.

The installation of the device is evident from FIG. 1, wherein the separation nut has been tightened down on the bolt. The bolt can be provided with a socket for internal wrenching, if desired, and can be held by a wrench such as an Allen-head type from the left hand end in FIG. 1 by removing the cap and passing the wrench through the body. Alternatively, the fastener can be completely tightened down first, and then the body can be mounted by bolts 22. It will be understood that there are numerous combinations of suitable wrenching arrangements. When the catcher is finally in place, it serves as a standby member for catching the bolt when the nut and bolt are separated. When this occurs, the bolt is shot to the left, as shown in FIG. 3, and the tapered head readily pushes out the retainer fingers and passes through them. It is convenient for the bolt head to be tapered as shown to facilitate the deflection of the fingers, but it is not necessary. A cylindrical head would function similarly.

As soon as the bolt passes beyond the retainer fingers, the fingers snap in under the head, and rebound of the bolt into the holes in flanges 10 and 11 is thereafter impossible. The bolt head then crashes into discs 34 and deforms them. The energy expended in this deformation is not transmitted to the surrounding structure, and therefore the shock on flange 10 is greatly reduced. In fact, it is possible almost to eliminate it.

The discs are not intended to be springy. Instead they are intended to be distorted, in order to expend energy.

The body is readily reusable and many times the catcher sleeve is also reusable. The cap is readily removable and replaceable. The sleeve is removable and replaceable simply by unscrewing the cap and pulling the sleeve out. Therefore the device is one of substantial simplicity, economy, and reliability.

This invention is not to be limited by the embodiment shown in the drawings and described in the description which is given by way of example and not of limitation, but only in accordance with the scope of the appended claims.

I claim:

1. A bolt catcher for arresting and retaining a flying headed bolt comprising: a body having axis and an axial passage opening at a base end of the body and adapted to receive and pass the head of the bolt; a plurality of retainer fingers adapted to spread apart to pass the bolt and to snap under its head after it passes, said retainer fingers being attached to the body within the passage; and a deformable barrier in the path of the bolt head on the opposite side of the fingers from the base end, adapted to be deformed by the bolt, thereby to dissipate kinetic energy thereof.

2. A bolt catcher according to claim 1 in which the retainer fingers extend toward the center of the passage as they extend away from the base end.

3. A bolt catcher for retaining a flying headed bolt comprising: a body having a base end, an axis, and an axial passage extending into the body from the base end; a catcher sleeve inside the passage, having a central opening and being connected to the body; a plurality of retainer fingers attached to the catcher sleeve and extending toward the axis as they extend away from the base end, said opening being adapted to receive and pass the head of the bolt, and the fingers being adapted to be sprung apart by the head and to snap behind the head to retain the head after it has passed the fingers; a cap attached to the body having a sink therein; a deformable barrier in said cap so disposed and arranged as to be struck by the bolt and to be deformed by it, thereby to dissipate kinetic energy thereof.

4. A bolt catcher according to claim 3 in which the barrier comprises a plurality of spaced-apart discs.

5. A bolt catcher according to claim 3 in which the barrier comprises a plurality of ring-shaped washers and discs, the discs and washers being alternated in a stack, the stack being retained by a lock ring seated in a groove in the cap.

6. A bolt catcher according to claim 5 in which the cap is threaded to the body, and in which the catcher sleeve includes a shoulder which hooks over the end of the body removed from the base end, and which shoulder is held between the cap and the body.

No references cited.